May 8, 1928.

J. A. WHITE

ROTARY SCREEN

Filed Sept. 26, 1922

Inventor
Joseph A. White.
by his Attorneys
Howson & Howson

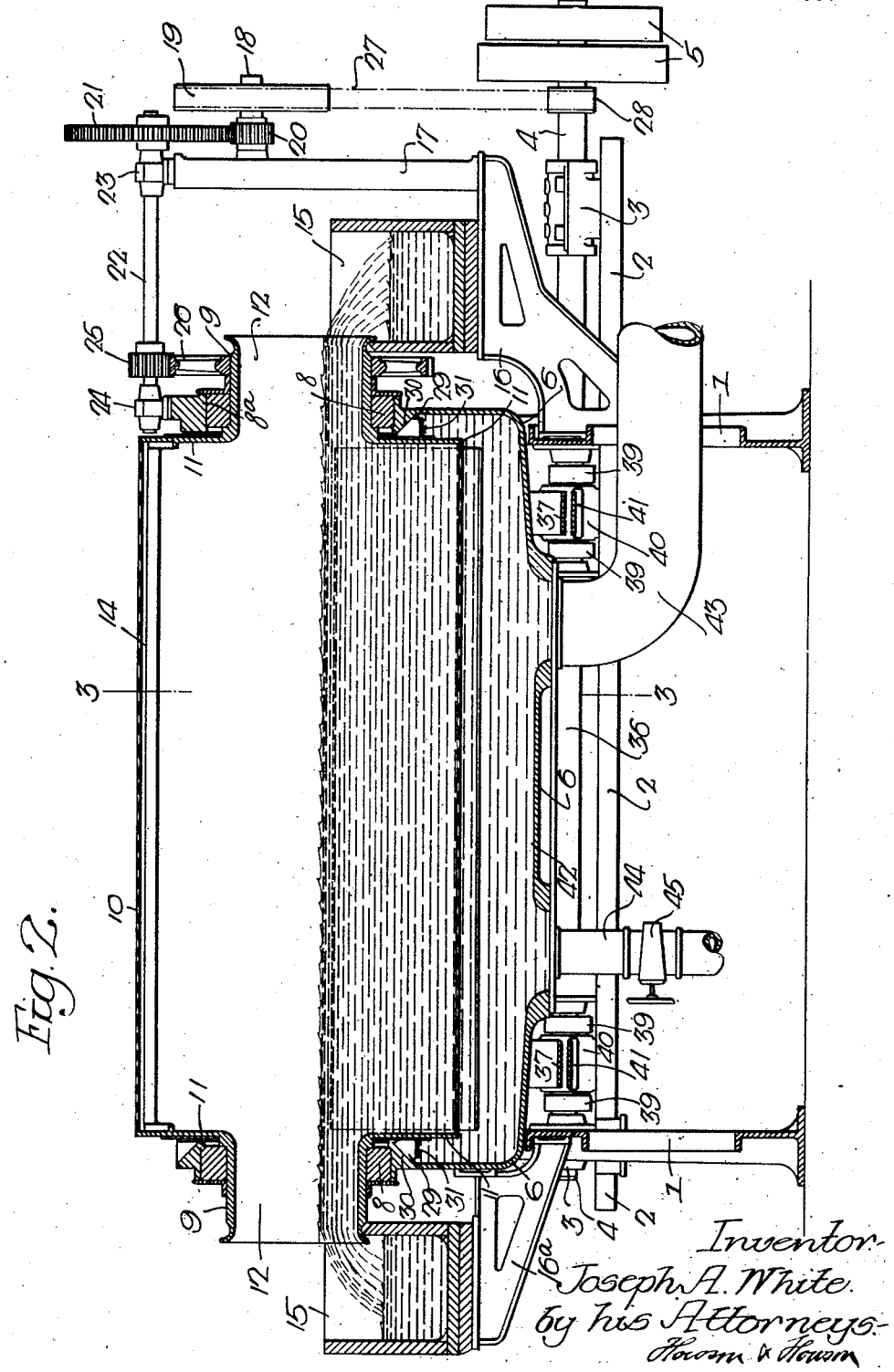

May 8, 1928.
J. A. WHITE
ROTARY SCREEN
Filed Sept. 26, 1922
1,668,579
3 Sheets-Sheet 3
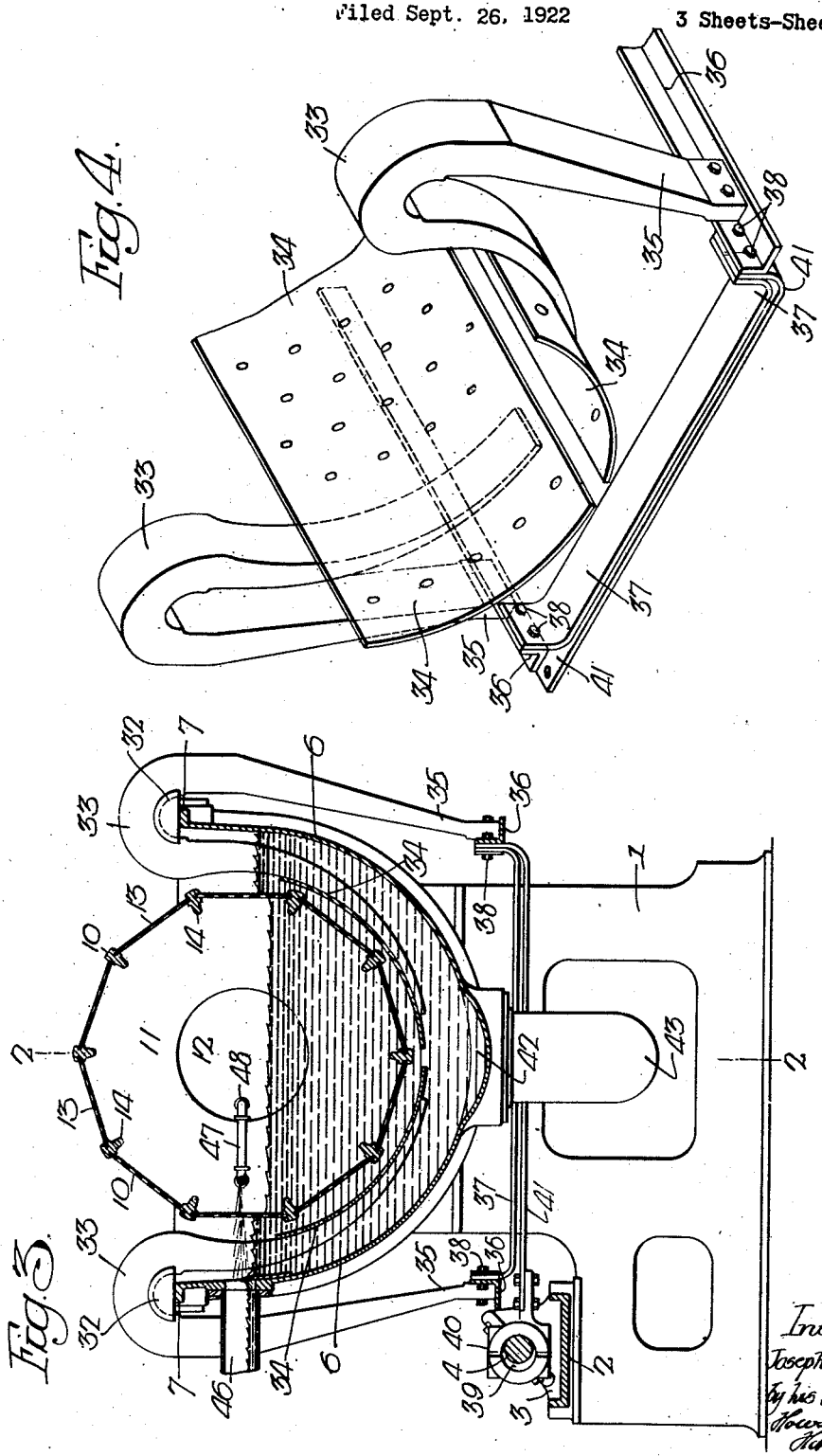
Inventor
Joseph A. White
by his Attorneys Patented May 8, 1928.

1,668,579

UNITED STATES PATENT OFFICE.

JOSEPH A. WHITE, OF PHILADELPHIA, PENNSYLVANIA, ASSIGNOR TO THE MOORE & WHITE COMPANY, OF PHILADELPHIA, PENNSYLVANIA, A CORPORATION OF PENNSYLVANIA.

ROTARY SCREEN.

Application filed September 26, 1922. Serial No. 590,686.

My invention relates to certain improvements in rotary screens for screening paper stock.

One object of the invention is to provide a screen, in which the stock will be thoroughly screened and in which the cylinder will be cleaned with each movement of the mechanism in the vat.

Another object of the invention is to provide means within the vat to cause the stock to pass through the screen, the return movement of the means clearing the meshes of the screen from adhering stock.

A further object of the invention is to make the agitating means in the form of U-shaped rockers, which are connected together and to operating means on the outside of the vat.

Still another object of the invention is to make a polygonal screen, which is open at both ends, to allow for the free discharge of material.

In the accompanying drawings:

Fig. 2 is a longitudinal sectional view through my improved rotary screen, the section being on the line 2—2, Fig. 3;

Fig. 3 is a transverse sectional view on the line 3—3, Fig. 2; and

Fig. 4 is a detached perspective view, showing the rockers and their connections.

Figure 1:
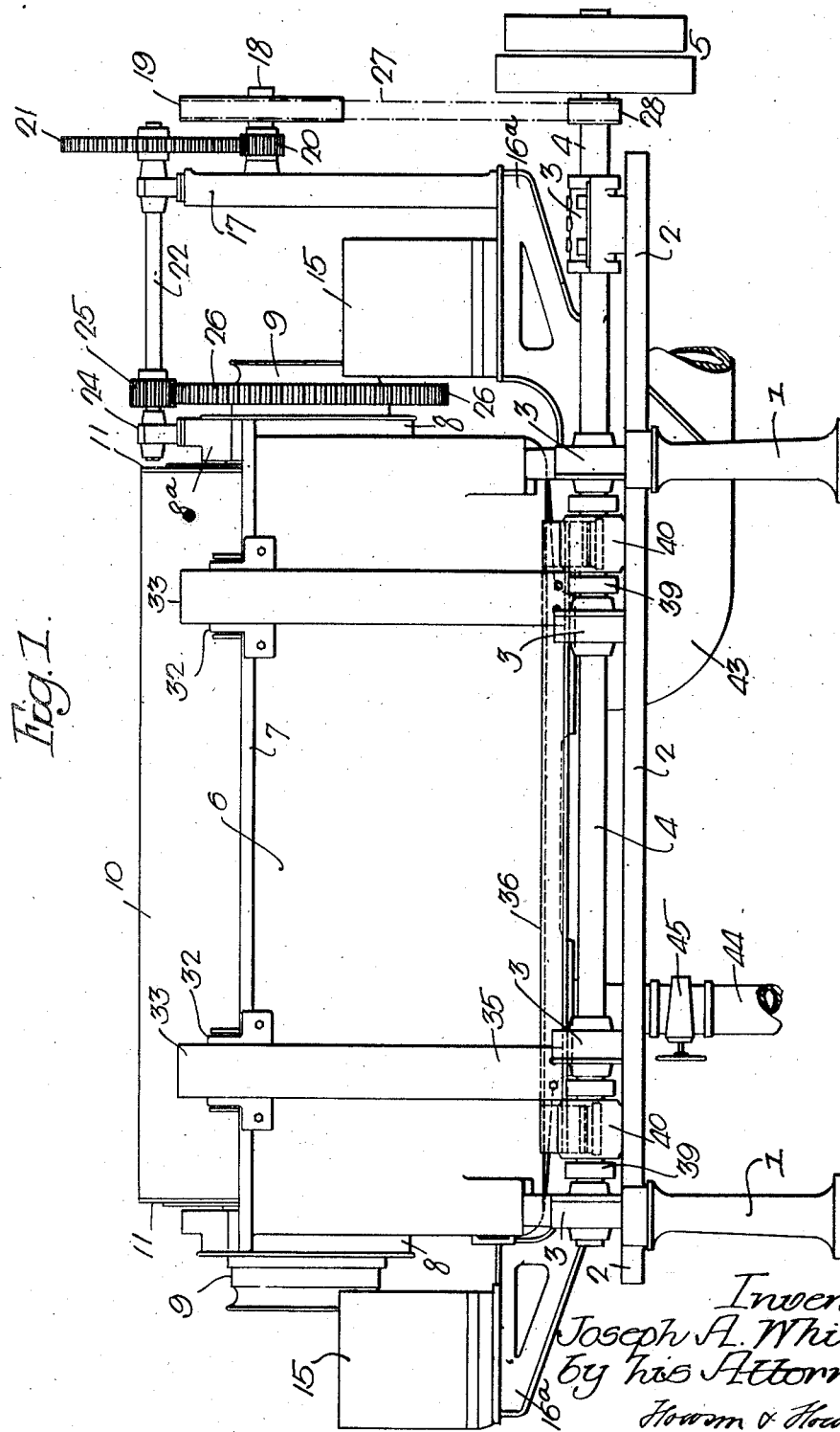
Fig. 1 is a side view of my improved rotary screen.

Referring to the drawings, 1, 1 are the ends of the frame of a machine connected by a plate 2 on which are the bearings 3 for the driving shaft 4, which has suitable pulleys 5 at one end. 6 is the vat, which is semi-circular in cross section. The sides are extended vertically and are flanged as at 7 so that the top of the vat is some distance above the line of stock in the vat. The vat has bearings 8 at each end. Mounted in these bearings are the trunnions 9 of the screen 10. These trunnions are formed integral with the solid ends 11 of the screen. In these trunnions are outlet passages 12 for the screened stock.

The screen is made preferably in the form of a polygon having a number of flat screen sections 13 mounted on longitudinal ribs 14, as clearly shown in Fig. 3. The screen discharges into troughs 15 at each end of the machine. One trough is mounted on a bracket 16 and the other trough is mounted on a bracket 16ª. These brackets are secured to the ends of the machine. The bracket 16 is extended. Mounted on this bracket is a standard 17 forming a bearing for a stud 18. On the hub of the wheel 19 is a pinion 20. This pinion meshes with a gear wheel 21 on a shaft 22 mounted in a bearing 23 on the standard and a bearing 24 on one of the caps 8ª of the bearing 8. On the shaft 22 is a pinion 25, which meshes with a gear wheel 26 secured to one of the trunnions 9, as clearly shown in Fig. 2. The wheel 19 is driven by a belt 27, which passes around a pulley 28 on the shaft 4.

29, 29 are sections of segmental packing located between the ends of the cylinder and the ends of the vat, being held against the beveled portions 30 of the bearings by plates 31 on the vat. This packing prevents any stock from coming in contact with the bearings or mixing with the material that has been screened.

Mounted on the sides 7 of the vat are saddles 32 for the rockers 33, which are U-shaped as shown in Fig. 3. There are two rockers spaced apart on each side of the vat. Secured to each pair of rockers is a perforated segmental plate 34. These plates extend in the space between the sides of the vat and the screen and a short reciprocating motion is given to the plates and to the rockers so that the plates will cause the paper stock to be forced through the meshes of the screen into the interior of the cylinder when moving in one direction, and will tend to clear the meshes of the screen when moving in the opposite direction.

The outer ends 35 of the arms are connected by angle bars 36 and the sets of arms are connected together by comparatively thin plates 37, which are bent at an angle at each end and are secured to the arms by bolts 38. On the driven shaft 4 are eccentrics 39 and on the eccentrics are straps 40, which are connected to spring plates 41 bent at the outer ends and are connected to the bars 36 on the side opposite to that of the shaft so as to provide a long connection between the shaft and the arm. A channel 42 is preferably formed in the bottom of the vat. The bottom of the vat is connected to a feed pipe 43 and also to a washout pipe 44 provided with a valve 45.

46 is a pipe that communicates with the upper portion of the vat and with the water supply. This pipe is connected to a saveall on an auxiliary screen where the stock, which is not passed through the main screen, is rescreened. Such a screen is shown and described in an application for patent filed by me of even date herewith, and which has eventuated in Patent No. 1,505,835 of August 19, 1924.

The operation is as follows: The stock is fed into the bottom of the vat through the feed pipe 43, and, when motion is imparted to the shaft 4, the rockers 33 cause the perforated plates 34 to have a limited reciprocating motion to and from the screen. This motion is comparatively rapid so that the stock in the vat is constantly agitated. The stock between the segmental plates and the fine screen is forced through the screen, as it rotates. That portion of the stock that adheres to the surface of the screen is drawn away from the screen by the suction as the plates are moved away from the screen, so that there is an alternate screening of the material and cleansing of the screen. As the screen is not blocked by adhering material, the screening process is thorough and very rapid.

In addition to the suction caused by the movement of the plates, a spray pipe 47 is provided, which is connected to a water, or stream, supply at 48. This spray pipe is located on the side of the cylinder and sprays water, or steam, against the inside of the screen, materially aiding in cleansing the surface of the screen.

I claim:

1. The combination of a vat; a rotating screen mounted within the vat; rockers on each side of the vat; perforated plates carried by the rockers and located between the screen and the vat; a connecting rod extending under the vat and attached to the rockers on each side thereof; and means for imparting movement to the rockers.

2. The combination of a vat; a rotating screen mounted in the vat and having an opening at each end; trunnions for the screen; bearings on the vat for the trunnions; rockers on each side of the screen having arms extending into the space between the vat and the screen; perforated plates on said arms, the arms extending on the outside of the vat; bars connecting the arms on each side of the vat; spring plates connecting the bar on one side of the vat with the bar on the opposite side of the vat; a shaft; and an eccentric connected to the rockers for imparting movement thereto.

3. The combination of a vat; means for supporting the vat; a polygonal screen mounted in the vat; perforated plates forming part of the screen; a feed pipe communicating with the lower portion of the vat; an outlet pipe in the screen; rockers on each side of the vat; perforated plates carried by the rockers; and means for imparting movement to the plates.

4. The combination of a vat; means for supporting the vat; a rotary screen mounted in the vat; saddles mounted on the upper edge of the vat; rockers mounted on the saddles, each rocker being U-shaped and having one arm extending into the vat and the other extending on the opposite side thereof; perforated plates carried by the arms of the rockers within the vat; means for connecting the outside arms of the rockers on each side; a shaft on one side of the vat; an eccentric on the shaft; and a flexible connection actuated by the eccentric and attached to the rocking mechanism on the opposite side of the vat.

5. The combination of end frames; a vat supported on said frames; a plate extending from one frame to the other; bearings on said plate; a driven shaft mounted in the bearings; a rotating, polygonal screen mounted within the vat and having trunnions; bearings in the vat for the trunnions, said screen having outlet openings extending through the trunnions; troughs on each end of the machine into which the screen discharges; saddles on the upper ends of the vat; U-shaped rockers mounted on the saddles; plates attached to the rockers and located in the space between the vat and the screen; means for connecting the rockers on one side with those on the opposite side; eccentrics on the shaft; an eccentric rod extending from the shaft and attached to the rockers on the side of the machine away from the shaft; and a feed pipe communicating with the bottom of the vat.

JOSEPH A. WHITE.